United States Patent
Casal Kulzer et al.

(10) Patent No.: US 7,788,016 B2
(45) Date of Patent: Aug. 31, 2010

(54) METHOD FOR OPERATING AN INTERNAL COMBUSTION ENGINE

(75) Inventors: Andre F Casal Kulzer, Boeblingen (DE); Christina Sauer, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 11/982,887

(22) Filed: Nov. 5, 2007

(65) Prior Publication Data

US 2008/0172168 A1 Jul. 17, 2008

(30) Foreign Application Priority Data

Nov. 8, 2006 (DE) .................... 10 2006 052 631

(51) Int. Cl.
*F02D 41/00* (2006.01)
*F02B 11/00* (2006.01)
(52) U.S. Cl. ...................... 701/103; 123/295
(58) Field of Classification Search ......... 701/103–105, 701/102, 115; 123/295, 299, 308
See application file for complete search history.

(56) References Cited

U.S. PATENT DOCUMENTS 6,260,520 B1 7/2001 Van Reatherford
6,390,054 B1 5/2002 Yang
6,779,498 B2 * 8/2004 Glensvig et al. ......... 123/90.16
7,004,116 B2 * 2/2006 Allen ........................ 123/299

FOREIGN PATENT DOCUMENTS

| DE | 199 27 479 | 12/1999 |
|----|------------|---------|
| DE | 101 27 205 | 9/2002 |
| DE | 101 34 644 | 2/2003 |
| JP | 2003-65053 A * | 5/2003 |
| WO | WO 98/10179 | 3/1998 |

* cited by examiner

*Primary Examiner*—Hieu T Vo
(74) *Attorney, Agent, or Firm*—Merchant & Gould P.C.

(57) ABSTRACT

A method for operating an internal combustion engine in a state of controlled self-ignition. The internal combustion engine includes a combustion chamber, at least one intake valve and at least one exhaust valve whose opening times can be changed. A fresh mixture is introduced into the combustion chamber during an intake stroke and an ignitable gas mixture is produced in the combustion chamber by way of the introduction of fuel and compressed in a compression stroke, whereby the gas mixture self-ignites toward the end of the compression stroke. The fresh mixture is introduced into the combustion chamber by way of a compression mechanism during the intake stroke.

7 Claims, 2 Drawing Sheets

Figure 1:
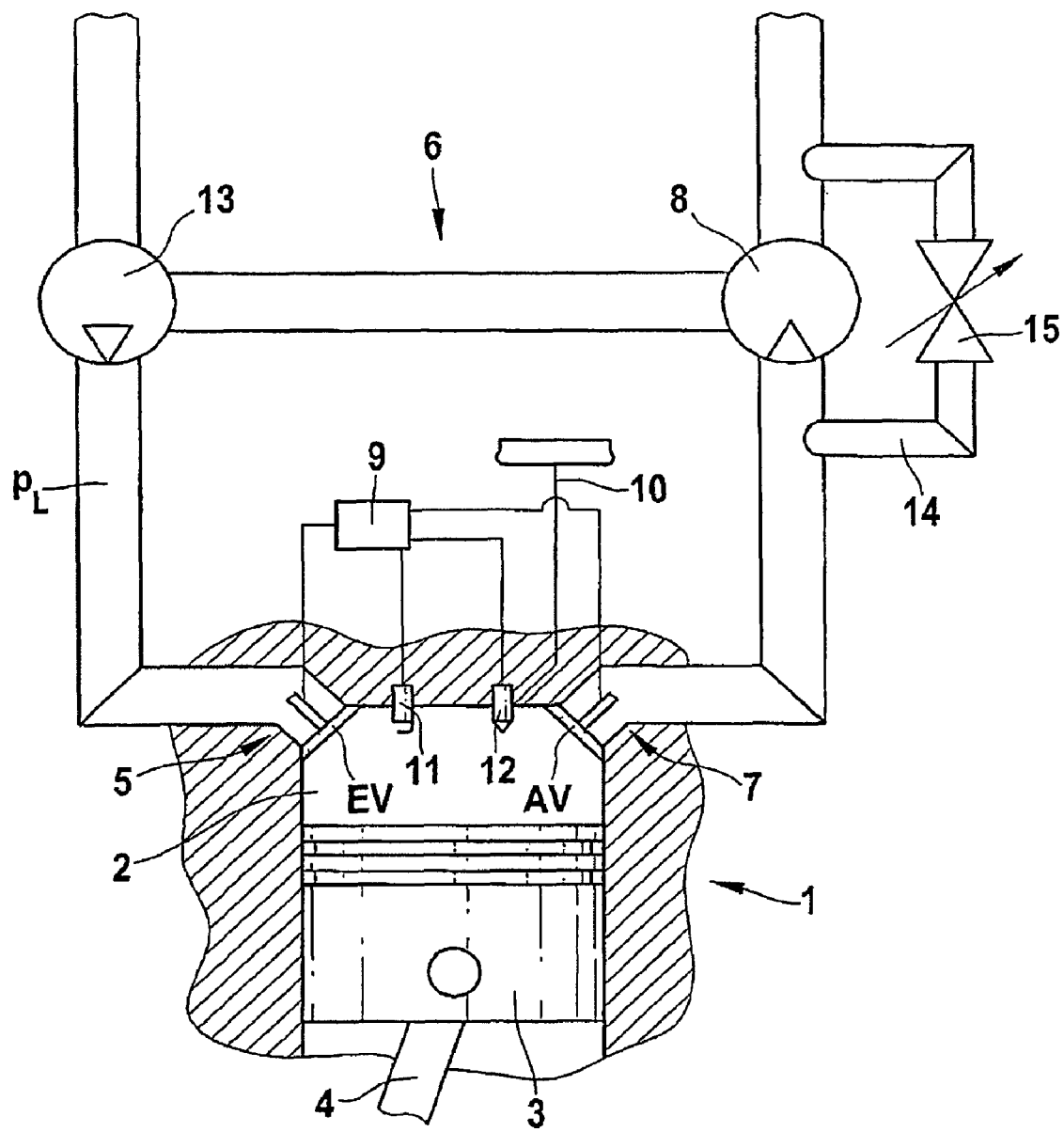

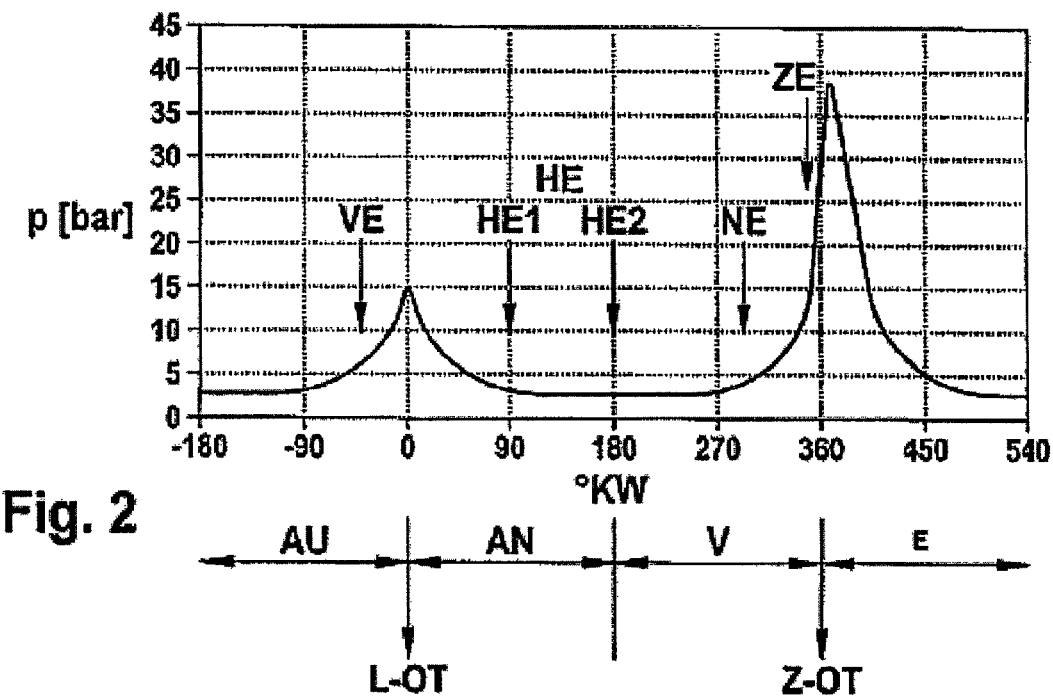
Fig. 2
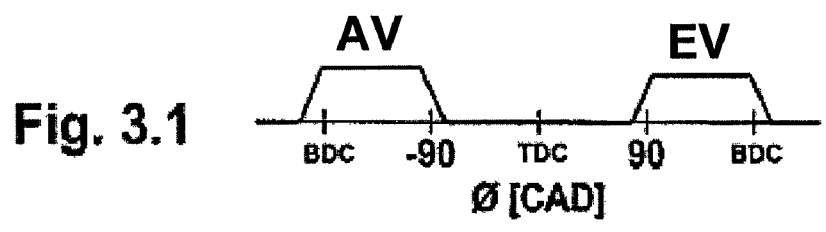
Fig. 3.1
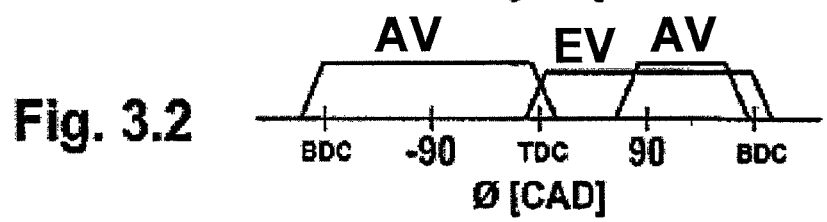
Fig. 3.2
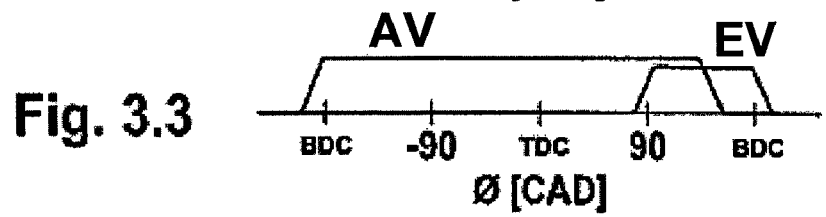
Fig. 3.3
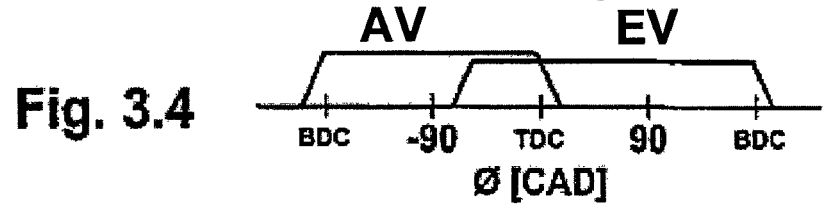
Fig. 3.4

METHOD FOR OPERATING AN INTERNAL COMBUSTION ENGINE

STATE OF THE ART

The invention at hand concerns a method for operating an internal combustion engine, especially a gasoline engine with direct gasoline injection, in a state of controlled self-ignition. The invention additionally concerns a control unit as well as a computer program to implement the method.

During the operation of an internal combustion engine in the HCCI mode (Homogenous Charge Compression Ignition), which is also denoted as CAI (Controlled Auto Ignition), ATAC (Active Thermo Atmosphere Combustion) or TS (Toyota Soken), the ignition of the air-fuel mixture does not result by means of an externally-supplied ignition but by means of a controlled self-ignition. The HCCI combustion process can, for example, be initiated by a large proportion of residual gases and/or by a high compression and/or a high temperature of the incoming air. A precondition for the self-ignition is a sufficiently high energy level in the cylinder. Internal combustion engines operated in the HCCI mode, which can be gasoline as well as diesel engines, are known; see, for example, the American patent U.S. Pat. No. 6,260,520, the American patent U.S. Pat. No. 6,390,054, the German patent DE 199 27 479 and the patent WO 98/10179.

The HCCI combustion has the advantage of reduced fuel consumption and less toxic emissions when compared to the combustion with a conventional externally-supplied ignition. The closed-loop control of the combustion process and especially the open-loop control of the self-ignition are, however, complex.

DISCLOSURE OF THE INVENTION

A task of the invention at hand is for that reason to increase the controllability of the combustion process in the HCCI mode.

This problem is solved by a method, a device as well as a computer program according to the independent claims. The problem is especially solved by a method for operating an internal combustion engine in a state of controlled self-ignition, wherein the internal combustion engine comprises a combustion chamber, at least one intake valve and at least one exhaust valve, whose opening times can be altered, wherein the fresh mixture is introduced into the combustion chamber during an intake stroke and an ignitable gas mixture is produced in the combustion chamber and is compressed in a compression stroke and wherein fresh air is introduced during the intake stroke into the combustion chamber by means of a compression mechanism. The internal combustion engine at hand is preferably a gasoline engine with direct gasoline injection. The compression mechanism can preferably be a turbocharger or a compressor. Provision is preferably made for the internal combustion engine to be driven by the stored residual gas during the charge transfer. The storage of residual gas allows for an increase in the temperature of the gas mixture in the combustion chamber to a sufficient level for self-ignition to take place. By means of the residual gas storage, which can be constituted by an internal as well as an external exhaust gas recirculation, the temperature in the combustion chamber can especially be controlled in an open-loop, and the oxygen content can be controlled as well. Provision is preferably made for the Lambda value of the fuel-air-residual gas mixture in the combustion chamber to be controlled by the supercharging pressure of the compression mechanism. The supercharging pressure is a parameter, which determines the fresh mixture in the combustion chamber and thereby the oxygen content. The supercharging pressure is now used according to the invention as an additional variable for the open-loop control of the Lambda value.

The problem mentioned at the beginning of the application is now solved by means of a device, especially an internal combustion engine or a control unit for an internal combustion engine, which is equipped to implement a method according to the invention and is equipped as well as with a computer program with a program code for the implementation of all steps in compliance with a method according to the invention if the program is executed on a computer. The problem mentioned at the beginning of the application is also solved by using an internal combustion engine with a compression mechanism in the engine air intake for the implementation of a method according to the invention.

The problem mentioned at the beginning of the application is also solved by a computer program with a program code for the implementation of all steps in compliance with a method according to the invention if the program is executed on a computer.

An example of embodiment of the invention at hand is explained in detail in the following using the accompanying diagrams. In so doing, the following are shown:

SHORT DESCRIPTION OF THE DIAGRAMS

FIG. 1 a schematic of a cylinder of an internal combustion engine;

FIG. 2 a diagram of the combustion chamber pressure versus the crankshaft angle;

FIG. 3 opening and closing times of the charge-cycle valves.

FORMS OF EMBODIMENT OF THE INVENTION

First the technological environment of the invention is described using FIGS. 1 to 3. In FIG. 1 a cylinder 1 of an otherwise unspecified internal combustion engine is depicted, which as a rule consists of several cylinders. The cylinder 1 comprises a combustion chamber 2, in which a piston 3 with a connecting rod 4 is disposed in such a way to allow it to travel. The connecting rod 4 is connected to an unspecified crankshaft. An inlet 5 with an intake valve EV opens out into the combustion chamber 2. An outlet 7 with an exhaust valve AV opens out additionally into the combustion chamber 2. The intake valve EV as well as the exhaust valve AV are actuated electrohydraulically. The internal combustion engine is therefore equipped with a so-called electrohydraulic valve control system (EHVS). An electrohydraulic valve control system allows for an actuation of the valves independent of the crankshaft position. Ambient air is drawn into the combustion chamber 2 by way of the inlet 5. The combustion exhaust gases are given off again to the ambient air by way of the outlet 7. By means of a suitable opening time of the exhaust valve AV, for example an opening of the exhaust valve AV during the intake stroke of the internal combustion engine, a so-called internal exhaust gas recirculation can be implemented, in that exhaust gas from the outlet 7 in fact flows back, respectively is drawn back, into the combustion chamber 2 during the intake stroke of cylinder 1.

A spark plug 11 as well as a fuel injector 12 opens out into the combustion chamber 2 in a known manner. The fuel injector 12 is preferably a piezoelectric fuel injector or an electrohydraulic fuel injector. The fuel injector 12 is connected by a high pressure line 10 to an unspecified high pressure rail of the internal combustion engine. The high pressure line 10 carries fuel to the fuel injector 12. The fuel injector 12 is actuated electrically by a control unit 9. The spark plug 11 as well as the intake valve EV and the exhaust valve AV are correspondingly controlled by the control unit 9. Instead of one intake valve EV and one exhaust valve AV, provision can also be made here for several intake valves EV and several exhaust valves AV.

In electrohydraulic valve control systems without camshafts (EHVS), as they are known, for example, from the German patent DE 10127205 and the German patent DE 10134644, the lift and control times of the charge-cycle valves of an internal combustion engine can basically be freely programmed. The charge-cycle valves are in this case the one or several intake valve(s) EV and the one or several exhaust valve(s) AV.

The internal combustion engine 1 comprises in addition a turbocharger 6, which is only schematically depicted in FIG. 1. The turbo charger 6 comprises a turbine 8 in an inherently known way, which drives a supercharger 13. The supercharging pressure pl in the engine air intake of the internal combustion engine can be controlled by way of the rotational speed of the turbocharger. This rotational speed is controlled by a controllable bypass 14, which can bypass the exhaust gas turbine 8 and whose volumetric flow rate is controlled by way of a controllable throttle valve 15. Beside a turbocharger with a bypass, other mechanisms are also known for the closed-loop control of the supercharging pressure pl. These would include, for example, turbochargers with a turbine stage with variable turbine geometry, for example a variable pitch of the shovels or something similar. The supercharging pressure pl is controlled by the control unit 9 in the example of embodiment in FIG. 1 by means of the position of the bypass valve 15.

FIG. 2 shows a diagram of the combustion chamber pressure in the combustion chamber 2 of the internal combustion engine versus the crankshaft angle in degrees of crankshaft rotation (°KW). A crankshaft angle from −180° to 540° is depicted along the abscissa, and along the ordinate the combustion chamber pressure is plotted in bar. Top dead center is arbitrarily chosen here at 0° in the charge transfer L-OT. The charge transfer makes in a known way for the discharge of combusted exhaust gases, which occurs here between −180° and 0° of crankshaft revolution and for the intake of fresh ambient air, respectively a fuel-air mixture, which occurs here in the crankshaft angle region of 0-180°. One crankshaft revolution further at 360° of crankshaft revolution, top dead center of the ignition (Ignition-TDC) is achieved. The compression stroke V occurs between 180° of crankshaft revolution and 360° of crankshaft revolution. The combustion (expansion) E of the combusting gases occurs between 360° of crankshaft revolution and 540° of crankshaft revolution. The individual strokes are denoted in FIG. 2 with the exhaust (discharge) stroke AU from −180° to 0°, the intake stroke AN from 0° to 180°, the compression stroke V from 180° to 360° and the expansion stroke (combustion) E from 360° to 540°. During the compression stroke V the air-, respectively fuel-air mixture or fuel-air-exhaust gas mixture is compressed and thereby heated up. The mixture is ignited as a rule shortly before achieving ignition-TDC. This can result from an externally-supplied ignition, which is customary in gasoline engines, or by a controlled self-ignition in compliance with the type of operation according to the invention. The ignition of the mixture leads in a known manner to an increase in pressure, which is transferred into mechanical energy in the subsequent combustion (expansion) stroke E.

The opening and closing of the intake valve EV as well as the exhaust valve AV is depicted in each case in FIG. 3. The exhaust valve AV is generally opened during the exhaust stroke between −180° to 0° of crankshaft revolution as is the case in a 4-stroke engine. The intake valve EV is correspondingly opened in the range of the intake stroke between 0° of crankshaft revolution and 180° of crankshaft revolution. In FIG. 3 four cases are depicted, which in each case represent different valve opening strategies. In FIG. 3.1 the conventional valve opening strategy is depicted, wherein the exhaust valve AV is opened shortly before achieving bottom dead center BDC (UT) and remains open approximately until −90° of crankshaft revolution. In so doing, a portion of the combusted exhaust gases remains in the combustion chamber 2. The intake valve EV is first opened at approximately 90° of crankshaft revolution as soon as pressure equilibrium exists between the combustion chamber 2 and the engine air intake and remains open approximately until bottom dead center has been achieved. A so-called negative overlap is brought about in this manner, which makes sure that a portion of the combusted exhaust gases remains in the combustion chamber 2 and serves to heat up the fuel-air mixture introduced into the combustion chamber 2 during the intake stroke. In this manner, a fuel-air-exhaust gas mixture is produced in the combustion chamber 2.

FIG. 3.2 shows an alternative actuation strategy for the intake and exhaust valves. In this case the exhaust valve AV remains open between bottom dead center BDC (UT) and top dead center TDC (OT). The intake valve correspondingly remains open between top dead center TDC (OT) and bottom dead center BDC (UT). A very short valve overlap occurs in the range of top dead center. While the intake valve EV is opening, the exhaust valve AV is additionally opened in the range of approximately 90° of crankshaft revolution until shortly before bottom dead center BDC (UT) has been achieved. The intake valve as well as the exhaust valve are thus open in this range so that a portion of the discharged exhaust gases are again conveyed back by way of the exhaust valve into the combustion chamber 2.

An additional valve control strategy is depicted in FIG. 3.3, wherein the exhaust valve AV remains open between bottom dead center BDC (UT) across top dead center TDC (OT) until bottom dead center at approximately 180° of crankshaft revolution has been achieved. In addition the intake valve EV is opened approximately between 90° of crankshaft revolution and bottom dead center BDC (UT) at 180° of crankshaft revolution. In so doing, combusted exhaust gas is discharged out of the combustion chamber 2 between bottom dead center at −180° of crankshaft revolution and the achievement of top dead center at 0° of crankshaft revolution and is then again drawn out of the exhaust gas system into the combustion chamber 2 between 0° of crankshaft revolution and the closing of the exhaust valve AV, which in this case occurs at approximately 120° of crankshaft revolution. The intake valve EV is open here between approximately 90° of crankshaft revolution and the achievement of bottom dead center at 180° of crankshaft revolution so that fresh air can be drawn in during this time. A valve overlap also arises here, in this case approximately between 90° of crankshaft revolution and 120° of crankshaft revolution.

FIG. 3.4 shows a further variation of a valve control strategy, wherein the exhaust valve AV is open between bottom dead center at −180° of crankshaft revolution and top dead center at 180° of crankshaft revolution. The intake valve EV is open approximately between −60° of crankshaft revolution across top dead center at 0° of crankshaft revolution until bottom dead center at 180° of crankshaft revolution. In this instance, a valve overlap then arises approximately between −60° of crankshaft angle and the achievement of top dead center at 0°. A portion of the exhaust gas is thereby pressed into the engine air intake and again transported back into the combustion chamber 2 during the opening time of the intake valve between top dead center at 0° of crankshaft revolution and bottom dead center at 180° of crankshaft revolution.

The valve control in the example of embodiment in FIG. 3.1 produces a hot residual gas mass in the combustion chamber 2 and allows for a stratified fuel injection. This valve control strategy is, however, ideal for the stratification operation. The valve control strategy depicted using FIG. 3.4 is in contrast associated with a warm residual gas mass and allows for a homogenous charge of the combustion chamber 2 and thereby a homogenous operation of the internal combustion engine. The valve control corresponding to the examples of embodiment depicted in FIGS. 3.2 and 3.3 are in each case interim solutions between the extremes depicted in FIGS. 3.1 and 3.4. Different valve and fuel injection strategies are needed at different load levels. A high residual gas rate is necessary for very small loads in order to provide the required temperature for self-ignition. At this operating point, the residual gas storage is used in the combustion chamber 2 according to FIG. 3.1, whereby the exhaust valve is closed significantly before the gas transfer-TDC (OT). The compression of the residual gas mass located in the cylinder leads to a further increase in temperature. The fuel injection occurs as soon as the piston is located in the region of the gas transfer-OT. Due to the high temperatures, decomposition reactions occurring in the fuel change into reactive.by-products, which significantly influence the point of self-ignition time and in this instance reduce the point of self-ignition time. The intake valve is opened as soon as pressure equilibrium prevails between the intake manifold and the combustion chamber 2 in order to prevent losses of flow.

When moving toward greater loads, the danger exists that the cylinder charge ignites too early on account of the high temperatures, and the immediately subsequent very rapid combustion leads to pinging because small quantities of residual gas are present here. For this reason, the positive valve overlap is employed as the load increases. This is depicted in the examples of embodiment for valve control according to FIGS. 3.2, 3.3 as well as 3.4. In the process the required residual gas mass is drawn back out of either the exhaust gas duct or out of the intake port. The fuel injection than occurs during the intake stroke, whereby the point of injection time exerts an influence on the homogeneity of the cylinder charge. Furthermore, the possibility exists to precipitate a further injection of fuel during the compression stroke. The enthalpy of evaporation of the fuel causes in this instance a cooling of the cylinder charge, which works against self-ignition occurring to early and pinging during combustion. The fuel injection during the compression stroke can also be combined with an injection of fuel into the compressed residual gas mass, provided the valve control strategy of the residual gas storage according to FIG. 3.1 is used. At the same time the combination of several injections of fuel, which begin in the region of the gas transfer-TDC (OT) and continue across the intake stroke up into the compression stroke, is possible as is depicted in FIG. 3.

Different residual gas and fuel injection strategies are required at different load levels in the self-ignition mode of operation of a gasoline engine. For the recirculation of internal residual gas, the valve strategy for residual gas storage (negative valve overlap) is, for example, used as previously stated, whereby the exhaust valve is closed significantly before the gas transfer-TDC (OT). The residual gas mass remaining in the cylinder is compressed, and the intake valve opens as soon as the pressure in the cylinder has again achieved the intake manifold pressure in order to prevent losses of flow. A greater residual gas mass is required for smaller loads than for larger loads. The required increase for smaller loads results by way of closing the exhaust valve earlier. With the aid of direct fuel injection, the temporal position, respectively the timing of the fuel injection with regard to the degrees of crankshaft revolution, can be changed; and in so doing the timing of the combustion can be changed, respectively corrected. An early injection of fuel into the compressed residual gas mass advances the combustion focal point. Combustion misfires when changing from small to large loads result from an abrupt reduction of the residual gas mass, whereby the residual gas temperature in the first power stroke (combustion cycle) after the sudden load variation still corresponds to the temperature of the smaller load level. On account of the reduction of the residual gas masses, the temperature in this case is not sufficient to achieve the self-ignition temperature. During the variation from large to small loads, the higher temperature from the preceding power stroke with an abrupt increase in the residual gas mass leads to an early combustion in the first cycle after the load transfer.

In the case of larger loads, more fresh air is required for the complete combustion of the injected fuel than is the case with smaller loads. At least a stoichiometric air-fuel ratio is required with larger loads. The air surplus in the combustion chamber thereby necessarily reduces itself without an additional charging step. This leads on the one hand to a pinging combustion due to the decreasing dilution of the cylinder charge, and on the other hand the controllability of the combustion with the aid of the fuel injection diminishes. By means of the valve strategy employed with the residual gas storage, temperatures above 1000 K already arise during the charge transfer cycle. An injection of fuel into the compressed residual gas leads then to pre-reactions, which influence the self-ignition. The influence of the point of injection time on the self-ignition changes as a function of the oxygen content in the residual gas. If more residual oxygen is available, the ongoing pre-reactions intensify, and the influence of the point of injection time is greater than at a lower oxygen content. By means of supercharging, consequently an increase of the supercharging pressure pl to a value above the ambient pressure, the oxygen content in the residual gas can be held constant, and in so doing the controllability over the fuel injection is also possible at larger load levels without further restrictions. The residual oxygen content is simple to monitor using a closed-loop control to maintain a constant air ratio Lambda. Beside a turbocharger as depicted in FIG. 1, the supercharging can also, for example, result by using a compressor or something similar. It is likewise possible, for example, to produce supercharging using a resonance tube. The Lambda value of the fuel-air-residual gas mixture in the combustion chamber can be controlled using the supercharging pressure of the compression mechanism, hence in this case of the turbocharger 6. The Lambda value can also, however, likewise be changed by way of the residual gas storage and the quantity of injected fuel. In this respect, an additional possibility to control the Lambda value in a closed-loop is achieved by the turbocharger 6.

The invention claimed is:

1. A method of operating an internal combustion engine in a state of controlled self-ignition, wherein the internal combustion engine comprises a combustion chamber, at least one intake valve and at least one exhaust valve having adjustable opening times, the method comprising:

introducing a fresh fuel-air mixture into the combustion chamber during an intake stroke, wherein fresh air is introduced by means of a compression mechanism;

producing an ignitable gas mixture in the combustion chamber via introduction of the fuel-air mixture; and compressing the ignitable gas mixture in a compression stroke wherein the gas mixture self-ignites toward an end of the compression stroke.

2. A method according to claim 1 wherein the compression mechanism comprises a turbocharger.

3. A method according to claim 1, wherein the compression mechanism comprises a compressor.

4. A method according to claim 1, further comprising operating the internal combustion engine using residual gas storage during a charge transfer.

5. A method according to claim 1, further comprising controlling a Lambda value of the fuel-air-residual gas mixture in the combustion chamber at least by supercharging pressure of the compression mechanism.

6. A control unit for an internal combustion engine configured to operate the internal combustion engine in a state of controlled self-ignition, wherein the internal combustion engine comprises a combustion chamber, at least one intake valve and at least one exhaust valve having adjustable opening times, the control unit configured to implement steps comprising: introducing a fresh fuel-air mixture into the combustion chamber during an intake stroke, wherein fresh air is introduced by means of a compression mechanism; producing an ignitable gas mixture in the combustion chamber via introduction of the fuel-air mixture; and compressing the ignitable gas mixture in a compression stroke, wherein the gas mixture self-ignites toward an end of the compression stroke.

7. An internal combustion engine with a compression mechanism during an intake stroke configured to implement an algorithm of operating the internal combustion engine in a state of controlled self-ignition, wherein the internal combustion engine comprises a combustion chamber, at least one intake valve and at least one exhaust valve having adjustable opening times, the algorithm including steps comprising: introducing a fresh fuel-air mixture into the combustion chamber during an intake stroke, wherein fresh air is introduced by means of a compression mechanism; producing an ignitable gas mixture in the combustion chamber via introduction of the fuel-air mixture; and compressing the ignitable gas mixture in a compression stroke, wherein the gas mixture self-ignites toward an end of the compression stroke.

* * * * *